(12) United States Patent
Fishbein

(10) Patent No.: US 8,641,359 B2
(45) Date of Patent: Feb. 4, 2014

(54) SCOOTER WITH AN INTEGRAL LIFTING AND LOADING SYSTEM

(75) Inventor: Avner Fishbein, Kibbutz Afikim (IL)

(73) Assignee: Afikim Electric Vehicles Ltd., Kibbutz Afikim (IL)

( * ) Notice: Subject to any disclaimer, the term of this patent is extended or adjusted under 35 U.S.C. 154(b) by 0 days.

(21) Appl. No.: 12/667,475

(22) PCT Filed: Jul. 2, 2008

(86) PCT No.: PCT/IL2008/000909
§ 371 (c)(1),
(2), (4) Date: Jun. 2, 2010

(87) PCT Pub. No.: WO2009/004622
PCT Pub. Date: Jan. 8, 2009

(65) Prior Publication Data
US 2010/0282527 A1    Nov. 11, 2010

(30) Foreign Application Priority Data
Jul. 3, 2007  (IL) .......................................... 184390

(51) Int. Cl.
*B60P 3/073*  (2006.01)
*B60P 3/42*  (2006.01)
*B60P 9/00*  (2006.01)

(52) U.S. Cl.
USPC ........... 414/812; 414/462; 414/814; 414/921; 224/500

(58) Field of Classification Search
USPC .................. 414/462, 812, 814, 921; 224/500
See application file for complete search history.

(56) References Cited

U.S. PATENT DOCUMENTS

| 3,592,282 | A |   | 7/1971  | Soileau |
|-----------|---|---|---------|---------|
| 4,245,947 | A |   | 1/1981  | Clement |
| 5,011,361 | A |   | 4/1991  | Peterson |
| 5,230,522 | A |   | 7/1993  | Gehlsen et al. |
| 5,466,111 | A |   | 11/1995 | Meyer |
| 5,482,424 | A |   | 1/1996  | Jones |
| 5,730,236 | A | * | 3/1998  | Miller et al. ................. 180/65.1 |
| 6,419,050 | B1 |  | 7/2002  | Sardonico et al. |
| 6,866,288 | B2 | * | 3/2005 | Martin .......................... 280/647 |

(Continued)

FOREIGN PATENT DOCUMENTS

DE      3230179 A1    2/1984
DE      3343463 A1    6/1985

(Continued)

OTHER PUBLICATIONS

International Search Report for PCT Application No. PCT/IL2008/000909 mailed Dec. 29, 2008.

(Continued)

*Primary Examiner* — Scott Lowe
(74) *Attorney, Agent, or Firm* — Pearl Cohen Zedek Latzer Baratz LLP

(57) ABSTRACT

A mobility scooter device comprising an electrically powered wheeled vehicle provided with a lifting unit for lifting or lowering the vehicle. The lifting unit comprises an extendable lifting arm having two end portions a first end portion that is connected to the vehicle and a second end portion coupled to a support base provided with wheels. The lifting unit can be wheeled to bring the lifted vehicle over a transportation platform for mounting the vehicle body on the platform.

14 Claims, 10 Drawing Sheets

(56) References Cited

U.S. PATENT DOCUMENTS

| | | | |
|---|---|---|---|
| 7,296,960 B2 * | 11/2007 | Strong | 414/546 |
| 7,451,848 B2 * | 11/2008 | Flowers et al. | 180/208 |
| 7,594,556 B1 * | 9/2009 | Panzarella et al. | 180/169 |
| 7,967,095 B2 * | 6/2011 | Kosco et al. | 180/208 |
| 2003/0141121 A1 * | 7/2003 | Flowers et al. | 180/65.1 |
| 2006/0093462 A1 | 5/2006 | Pradenas | |
| 2006/0180399 A1 | 8/2006 | Stanislao | |

FOREIGN PATENT DOCUMENTS

| | | |
|---|---|---|
| WO | WO 88/03012 A1 | 5/1988 |
| WO | WO 99/36023 A1 | 7/1999 |
| WO | WO 03/066408 A1 | 8/2003 |

OTHER PUBLICATIONS

Supplementary European Search Report for European Application No. 08763665.0-1254 mailed Dec. 28, 2011.

* cited by examiner

Fig. 12

150 — Manually unload the lifting unit from the car to the floor.

114 — Assemble and open the lifting unit on the floor - with actuators or manually, 152 — Attach the lifting unit to the folded scooter positioned in the car.

116 — Unload scooter from the car - raise with actuator - and manually pull from the car.

154 — Separate lifting unit from scooter, both standing on the floor.

158 — Fold lifting unit - manually or with actuators - and disassemble for storage.

120 — Unfold the seat the tiller — manually.

122 — Open the assembly frame - with actuator.

124 — Unfold the seat – manually.

126  Scooter is ready to drive.

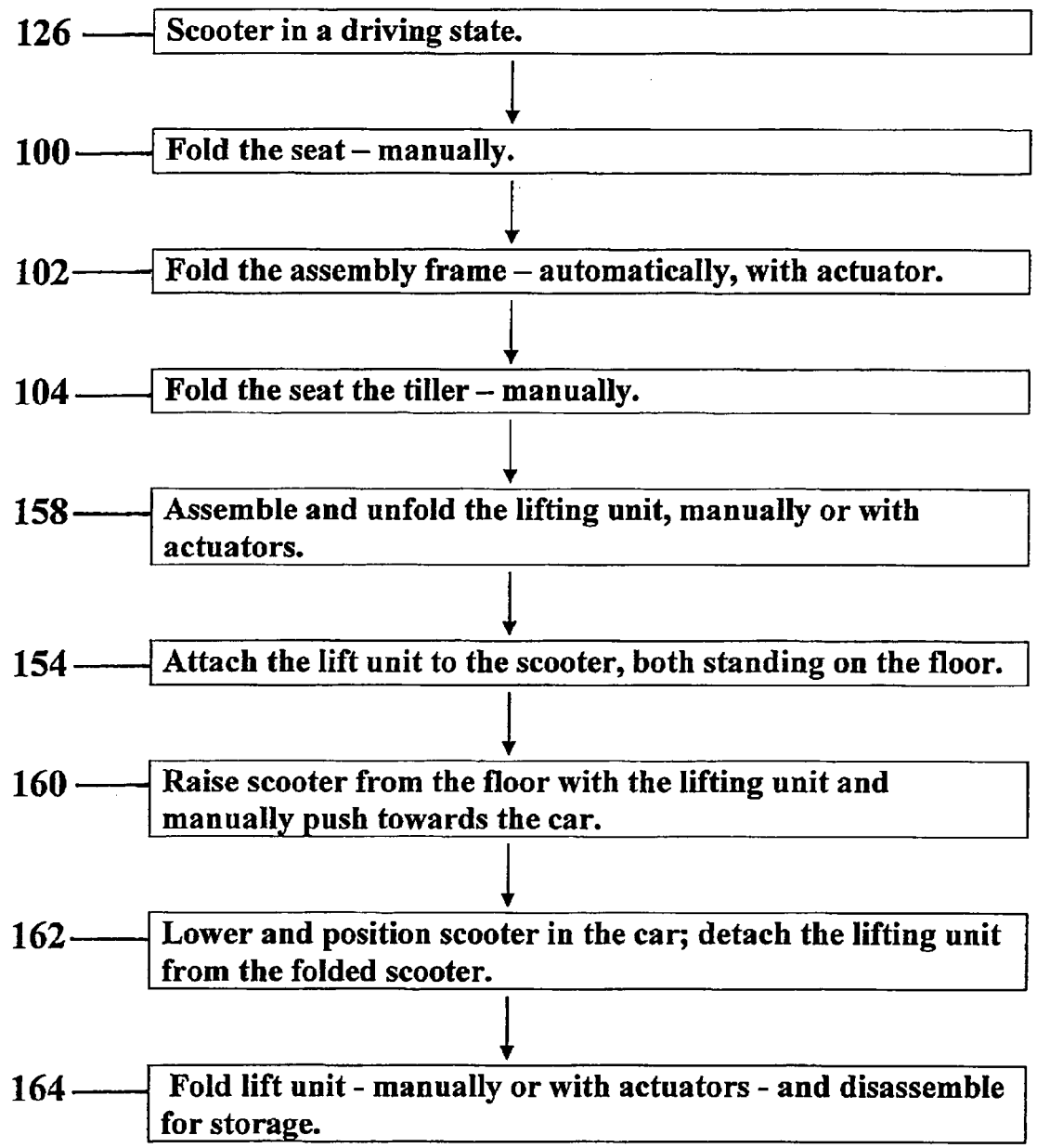

SCOOTER WITH AN INTEGRAL LIFTING AND LOADING SYSTEM

CROSS-REFERENCE TO RELATED APPLICATIONS

This application is a National Phase Application of PCT International Application No. PCT/IL2008/000909, International Filing Date Jul. 2, 2008, Published on Jan. 8, 2009claiming priority of Israel Patent Application, 184390, filed Jul. 3, 2007 both of which are incorporated herein by reference in their entirety.

FIELD OF THE INVENTION

The present invention relates to transportation. More particularly the present invention relates to a device and method of self-lifting and self-lowering of a scooter from and to a transporting platform.

BACKGROUND OF THE INVENTION

Personal scooters are a motorized means to enable mobility-limited persons the freedom of getting to places and locations they would not have been able to walk to. To enhance their usefulness scooters are transported beyond walking distances in cars, vans or trucks. Transporting is done by placing the scooter inside or on top of the vehicle or by attaching it to the side of the vehicle. Transporting by common privately owned sedan cars is limited by the bulk and weight of scooters. To enable transporting in a compact state, some scooters are designed to be easily disassembled into several components or folded into a more compact size. Disassembly and reassembly may be complicated and requires the manual handling of heavy components.

Prior art for the transporting of wheelchairs and scooters include several devices and methods. Typically, U.S. Pat. No. 5,482,424 (Jones et al.), incorporated herein by reference, describes a rack for mounting on the rear of a car for carrying a wheelchair. The wheelchair has a seat-supporting framework that includes two parallel horizontal frame members close to the ground. The rack includes a pair of chair support members for engaging the two horizontal frame members with the chair on the ground and powered lift members for raising the chair to a traveling position above the ground and for lowering the chair downwardly to the ground for removing the chair from the rack thereby eliminating any need for anyone to lift the chair.

U.S. Pat. No. 5,011,361 (Peterson), incorporated herein by reference, discloses a motor vehicle attachable carrier for scooters. The carrier has a mast with a power lift which moves a foldable platform between a lowered and a raised position. A weight-sensitive pedal on the platform responds to the presence of a load and defeats the platform fold-up mechanism. In the absence of a load, the platform will assume a folded position against the mast when raised. A fold-down lever with an attached foot pivots to engage the scooter when the platform is raised in a horizontal position with a load thereon.

US Patent Application 2006/0093,462 (Pradnas), incorporated herein by reference, describes a scooter lifting mechanism in which worm gear on the scooter itself is used to lift the scooter into position to be carried on, attached to the rear of a standard automobile vehicle. The self-lifting scooter uses its own battery power to operate the lifting mechanism. The bracket that carries the scooter can be removed and stored in the vehicle when not in use.

U.S. Pat. No. 5,466,111 (Meyer), incorporated herein by reference, discloses a wheelchair and lifting apparatus and method for loading a wheelchair and its occupant into a desired position in a vehicle, such as the driver's position, by attaching the wheelchair to an open door of the vehicle, utilizing the seat-height adjustment mechanism of the wheelchair that varies the height of the seat of the wheelchair relative to its wheels to lift the wheelchair off the ground and closing the vehicle door so as to position the wheelchair inside the vehicle in an unassisted manner by the occupant, and reversing this sequence of operation for unloading the wheelchair and its occupant from the vehicle.

Prior art disclosures require that vehicles transporting scooters be equipped with designated instruments and machinery to facilitate loading, downloading and carrying-on (externally attached or carried-in) of the scooters. To accommodate transportation of scooters large and relatively strong vehicles are required.

It is an object of the present invention to eliminate the dependency on auxiliary-devices for lifting and lowering scooters for the purpose of easy transporting of scooters.

Another object of the present invention is to introduce a scooter with self-lifting and loading capabilities.

Yet another object of the present invention is to provide such a scooter with self-lifting and loading capabilities, which is automatically or semi-automatically operated.

More objects and advantages of the present invention will become apparent after reading the present specification and considering the accompanying figures.

BRIEF DESCRIPTION OF THE INVENTION

There is thus provided, in accordance with some embodiments of the present invention, a mobility scooter device comprising:

an electrically powered wheeled vehicle provided with a lifting unit for lifting or lowering the vehicle, the lifting unit comprising an extendable lifting arm having two end portions a first end portion that is connected to the vehicle and a second end portion coupled to a support base provided with wheels which can be moved to bring the lifted vehicle over a transportation platform for mounting the vehicle body on the platform.

Furthermore, in accordance with some embodiments of the present invention, the extendable lifting arm comprises telescopically extendable bars.

Furthermore, in accordance with some embodiments of the present invention, the extendable lifting arm is electrically operated.

Furthermore, in accordance with some embodiments of the present invention, the extendable lifting arm is tiltable between a substantially horizontal position when not in use and a substantially vertical position when in use.

Furthermore, in accordance with some embodiments of the present invention, the scooter comprises foldable parts.

Furthermore, in accordance with some embodiments of the present invention, the lifting unit is automatically operated.

Furthermore, in accordance with some embodiments of the present invention, the lifting unit is semi-automatic.

Furthermore, in accordance with some embodiments of the present invention, the lifting unit is further provided with a remote control for remotely activating the lifting unit.

Furthermore, in accordance with some embodiments of the present invention, the lifting unit is detachably connected to the electrically powered wheeled vehicle.

Furthermore, in accordance with some embodiments of the present invention, the lifting unit is fixedly connected to the electrically powered wheeled vehicle.

Furthermore, in accordance with some embodiments of the present invention, the lifting unit is an integral part of the electrically powered wheeled vehicle.

Furthermore, in accordance with some embodiments of the present invention, there is provided a method for loading and downloading a mobility scooter onto and from a transportation platform, the method comprising:

providing a lifting unit for lifting or lowering the scooter, the lifting unit comprising an extendable lifting arm having two end portions a first end portion that is connected to the scooter and a second end portion coupled to a support base provided with wheels;

actuating the extendable lifting arm to lift the scooter; and wheeling the lifting unit with the lifter scooter to bring the lifted scooter over a transportation platform and mounting the scooter on the platform.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

The term "integrated" used in the text from herein after refers to a connection between a lifting and lowering unit and a scooter. In accordance with an embodiment of the present invention the connection is a-fixed-to-scooter connection. In another embodiment of the present invention, the connection is detachable. The lifting and lowering unit, in both connection-configurations, will be referred from herein after in the text as the "lifting unit".

FIG. 12 is a flow-chart describing the sequence of activities in lowering a scooter with a detachably-connected lifting unit from a car, in accordance with an embodiment of the present invention.

FIG. 13 is a flow-chart describing the sequence of activities in loading a scooter with a detachably-connected lifting unit into a car, in accordance with an embodiment of the present invention.

DETAILED DESCRIPTION OF EMBODIMENTS

The self-lifting scooter in accordance with embodiments of the present invention relates to a scooter with regular driving specifications that enables the user to be autonomous of auxiliary devices when loading, transporting and lowering the scooter to, in and from the trunk of a commonly available vehicle.

An integrated lifting unit in accordance with embodiments of the present invention, that includes automatic and/or semi-automatic movements and actuators, is provided, allowing "self-lifting" the scooter onto or into the trunk of a car whenever and wherever needed with no prior preparation required.

In an embodiment of the present invention the lifting unit is fixed-to-scooter structure of the scooter. In another embodiment of the present invention the lifting unit is detachably-connected to the structure of the scooter and is in a connected state only when the scooter is in the process of being loaded on a vehicle for transporting or in the process of being lowered to the ground for use. Each of the embodiments has advantages and disadvantages: A detachably-connected lifting unit reduces the weight the energy source of the scooter has to cope with in maneuvering. On the other hand a detachably-connected lifting unit can, at times, cause difficulties in the necessity to position the scooter so as to have the lifting unit exactly aligned with the scooter in order to connect and operate.

Figure 1:
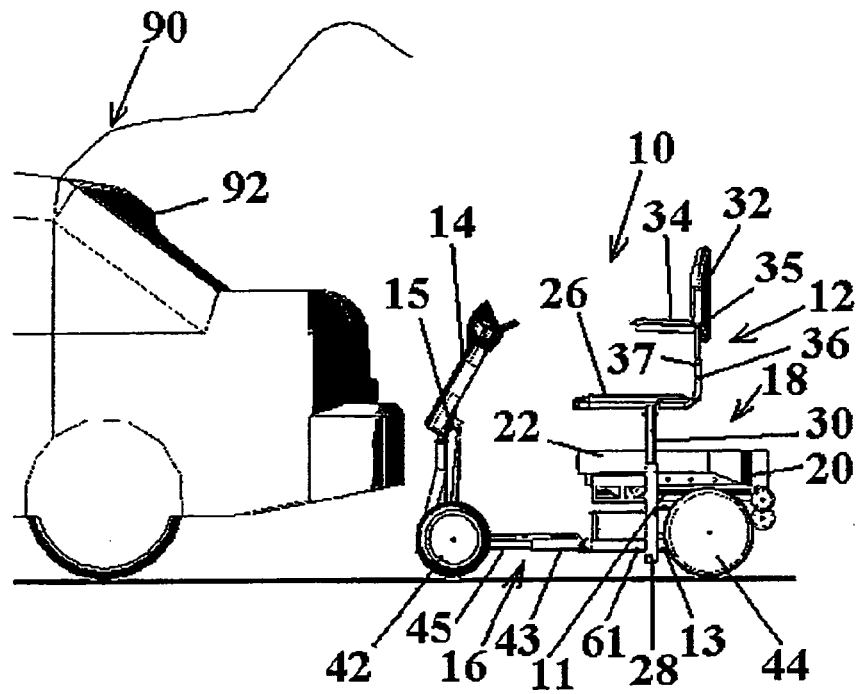
FIG. 1 illustrates a scooter with an integrated lifting unit, in accordance with an embodiment of the present invention, positioned at the rear of a car prior to being folded and loaded into a rear trunk of a car.

Given in the Figures and in the text that follows are embodiments, in accordance with the present invention, detailing the structure and operating mode of a self lifting unit for the lifting and lowering of a scooter The first six Figures presented should be viewed in a sequence. The sequence of FIG. 1 to FIG. 6 illustrates the loading of a scooter into a trunk of sedan car. In reverse, FIG. 6 to FIG. 1, illustrate the un-loading of a scooter from the trunk of the car to the ground, ready for independent motion. It is noted that while the Figures illustrate a sedan-type trunk the self lifting scooter according to embodiments of the present invention can be used in conjunction with other types of vehicles, with or without trunks.

A scooter coupled with a detachably-connected lifting unit looks substantially like a scooter coupled with a fixed-to-scooter, lifting unit. While FIG. 1 to FIG. 4 relate to scooters that have either one of the two embodiments of the lifting units, FIG. 5 and FIG. 6 relate only to a scooter with a fixed-to-scooter lifting unit.

FIG. 1 illustrates a scooter 10, in accordance with an embodiment of the present invention, positioned at the rear of a car 90 prior to being folded and loaded into the trunk 92 of the car. Scooter 10 comprises: an electric motor 11 operated by batteries 13 (typically rechargeable), a collapsible seat component 12, a foldable tiller 14, a compactable assembly-frame 16 and front and back wheel-pairs, 42 and 44, respectively. Lifting unit 18 is illustrated in a folded state and connected to the scooter.

Collapsible seat component 12 comprise: seat-support-bar 30 inserted into tube-bar 28, seat cushion 26, a back support 32 and a connection bar 36 with a folding hinge 37, linking the seat cushion 26 with the back support 32. Armrest padded bars 34 are pivotally connected 35 on both sides to the lower portion of the rim of the back support 32.

Compactable assembly-frame 16 comprises two telescopic pipes or slides, 43 and 45, capable of sliding one over the other, thus presenting a platform that can be compacted or stretched at will. Actuator 61 mechanically drives the sliding of telescopic pipes 43 and 45.

Motor 11 and batteries 13 are positioned under seat component 12, on the rear section of the assembly-frame 16, above wheel-pair 44. Tiller 14 is connected to the frontal edge of assembly-frame 16 with the angle of the upper section of the handlebar with respect to assembly-frame, adjustable by a pivot 15. Tube-bar 28 connects collapsible seat component 12 to assembly-frame 16.

Figure 2:
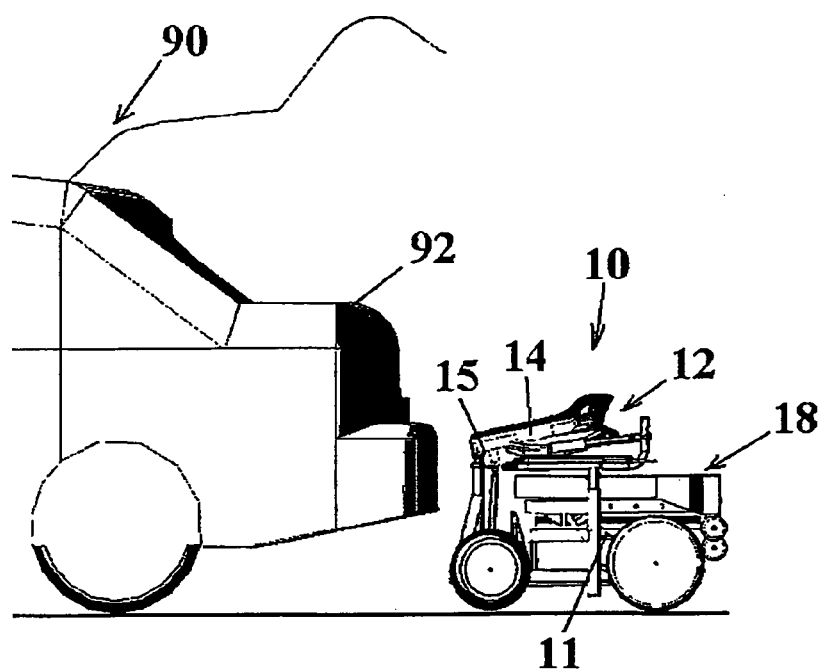
FIG. 2 illustrates the scooter shown in FIG. 1, folded and compacted so as to fit into a rear trunk of the car.

FIG. 2 illustrates scooter 10 (same scooter seen in FIG. 1) folded and in preparation to be placed into trunk 92 of car 90. Seat component 12 is lowered towards assembly-frame 16 by fully inserting seat-support-bar 30 into tube-bar 28. Back support 32 is folded horizontally over seat cushion 26 by folding hinge 37 in connection bar 36. Armrest padded bars 34 are folded horizontally under back support 32 by pivots 35. Assembly-frame 16 is compacted by sliding two telescopic pipes or slides 43 and 45 over each other, thus substantially decreasing the distance between front and back wheel-pairs 42 and 44.

Figure 3:
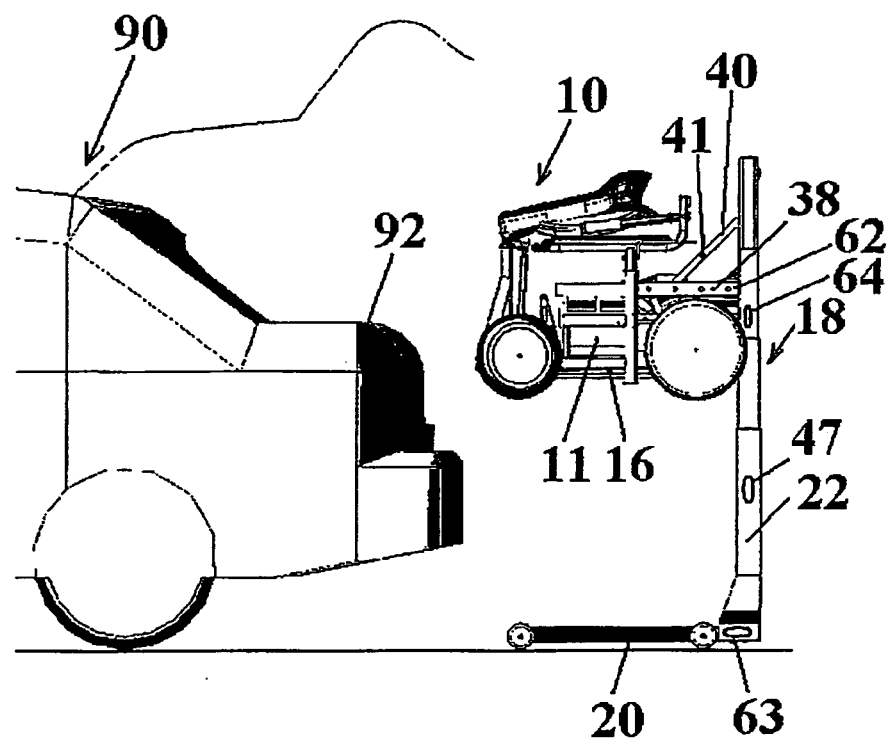
FIG. 3 illustrates the scooter shown in FIG. 1 with a lifting unit deployed and the scooter lifted and positioned to be loaded into the trunk of the car.

FIG. 3 illustrates a folded and compacted scooter 10 with lifting-unit 18 deployed and the scooter lifted and positioned to be loaded to trunk 92 of car 90. The sequence of activities for lifting the scooter follows: With the power of an actuator 62 lifting unit 18 is extended from the scooter 10. Lifting unit 18 is pivoted and raised from a horizontal to a vertical position by an actuator 64. With the aid of an actuator 63 a support base trolley wagon 20 is extended from the lower end of a lifting-arm 22 which comprises stretchable telescopic elements. For deployment of lifting unit 18 support base ("trolly wagon") 20 is pushed under assembly-frame 16. With the aid of an actuator 47 the telescopic components of arm 22 are stretched so as to raise scooter 10 from the floor. Plate 38 covers the motor and batteries (11 and 13, respectively) of scooter 10 and connects to the upper end portion of lifting-arm 22. Bar 40 connects and extends in an angular slope from arm 22 to plate 38 and thus supports plate 38 in carry the weight of scooter 10. Bar 40 has a pivot 41 at its center enabling it to fold. Scooter 10 is lifted and adjusted to a height that enables entry to trunk 92 of car 90. In some embodiments of the present invention the height can be pre-determined or monitored by the user (for example using a remote controller which can start and stop the lifting process at the user's will).

Figure 4:
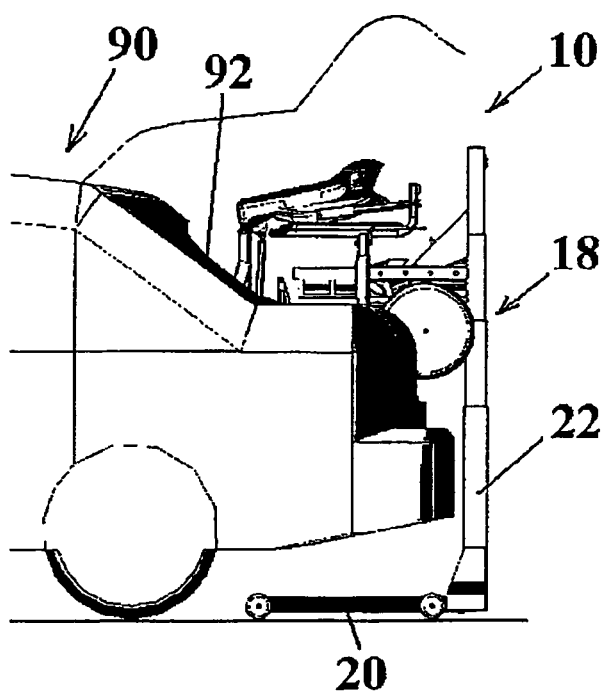
FIG. 4 illustrates the scooter shown in FIG. 1 lifted by the lifting unit ready to be lowered into the trunk of the car.

FIG. 4 illustrates scooter 10, lifted with the aid of lifting unit 18 and positioned in trunk 92 of car 90 ready to be lowered into the vehicle. Extended trolley wagon 20 is rolled manually (or alternatively, electrically) under car 90 and in doing so lifting-arm 22 delivers the scooter all the way past the threshold of trunk 92. By contracting the telescopic components of lifting-arm 22 scooter 10 is slowly and gently placed on the floor of trunk 92.

Figure 5:
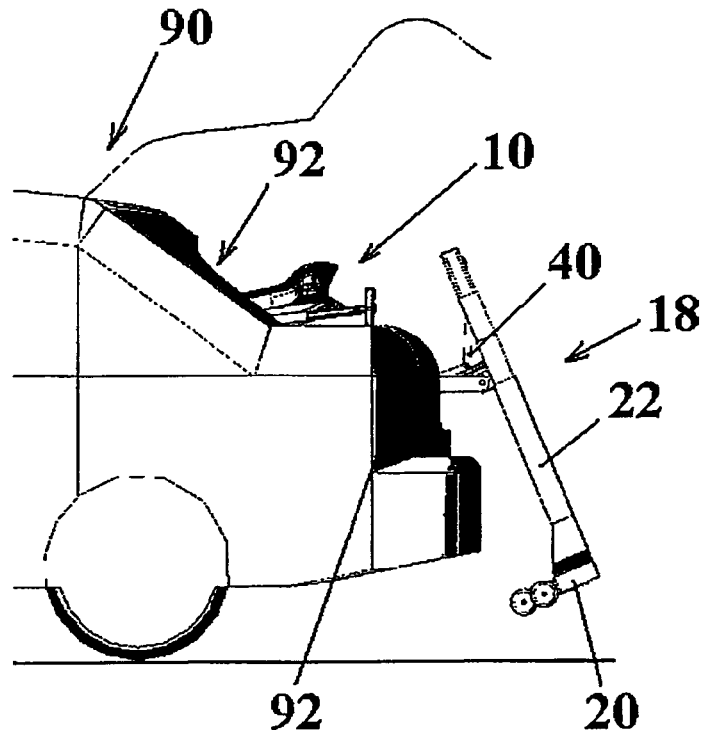
FIG. 5 illustrates the scooter shown in FIG. 1 placed in the trunk of the car with the lifting unit connected to the scooter in the process of folding.
Figure 6:
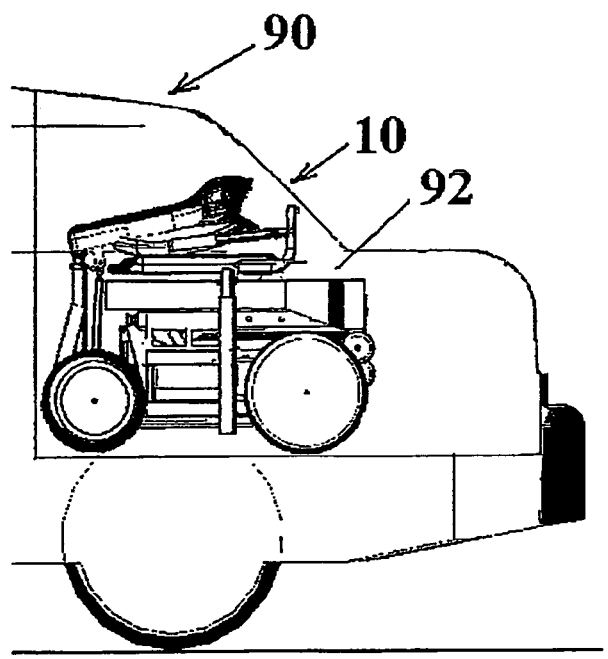
FIG. 6 illustrates the scooter shown in FIG. 1, placed in the closed trunk of the car following the use of the lifting unit.

FIG. 5 illustrates scooter 10 placed into trunk 92 of car 90 with lifting unit 18 in the process of folding. Following the placement of scooter 10 on the floor of trunk 92, trolley 20 is contracted to the base of lifting-arm 22 and the telescopic components of lifting-arm 22 are contracted to their minimum state. Bar 40 is folded and lifting-arm 22 is gradually pivoted, lifted and folded from a vertical to a horizontal position.

FIG. 6 illustrates scooter 10 folded and placed into closed trunk 92 of car 90 ready to be transported.

Figure 7:
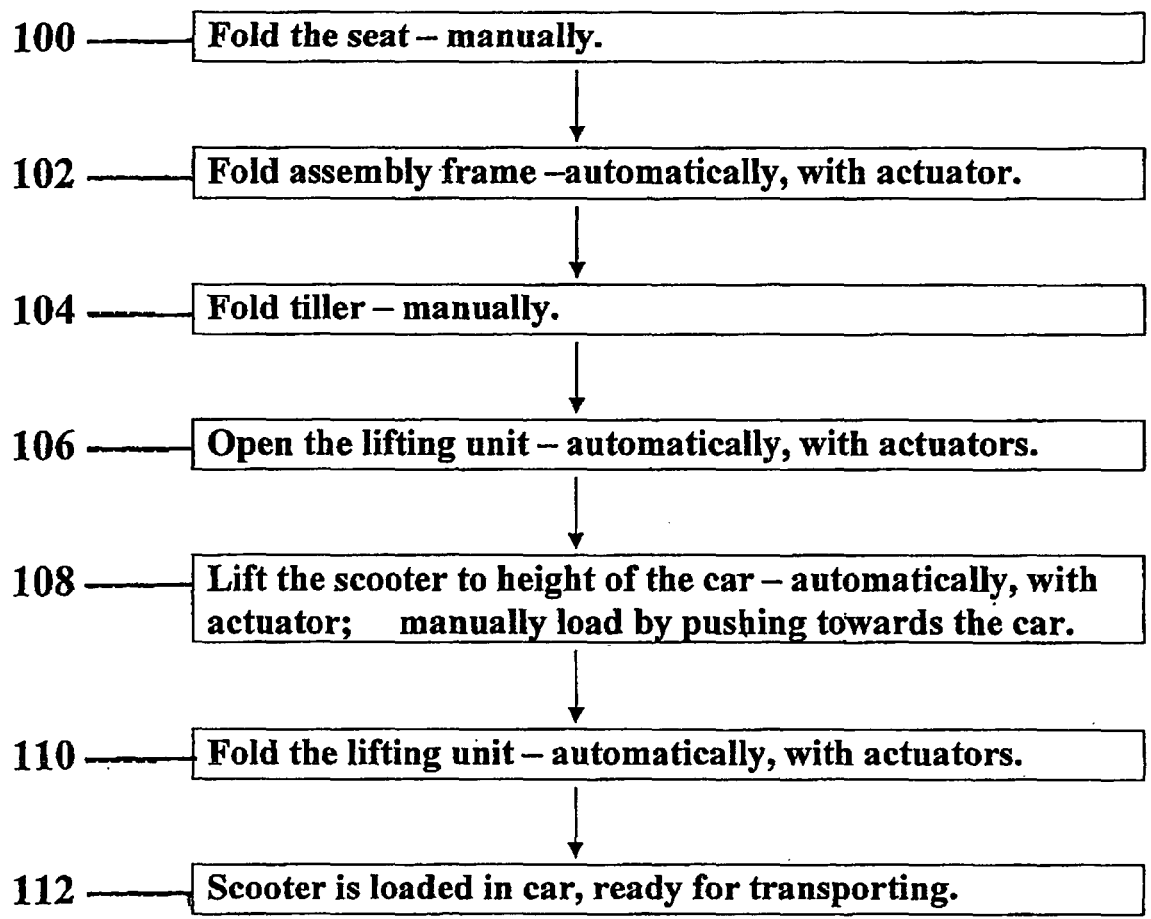
FIG. 7 is a flow-chart describing the sequence of activities in folding, lifting and loading a scooter with a fixed-to-scooter lifting unit into a car, in accordance with an embodiment of the present invention.

The sequence of activities of folding and loading scooter 10 to car 90, given in FIG. 1 to FIG. 6, is itemized in FIG. 7 in a flow-chart. The flow-chart also itemizes the manual and automatic activities.

Figure 8:
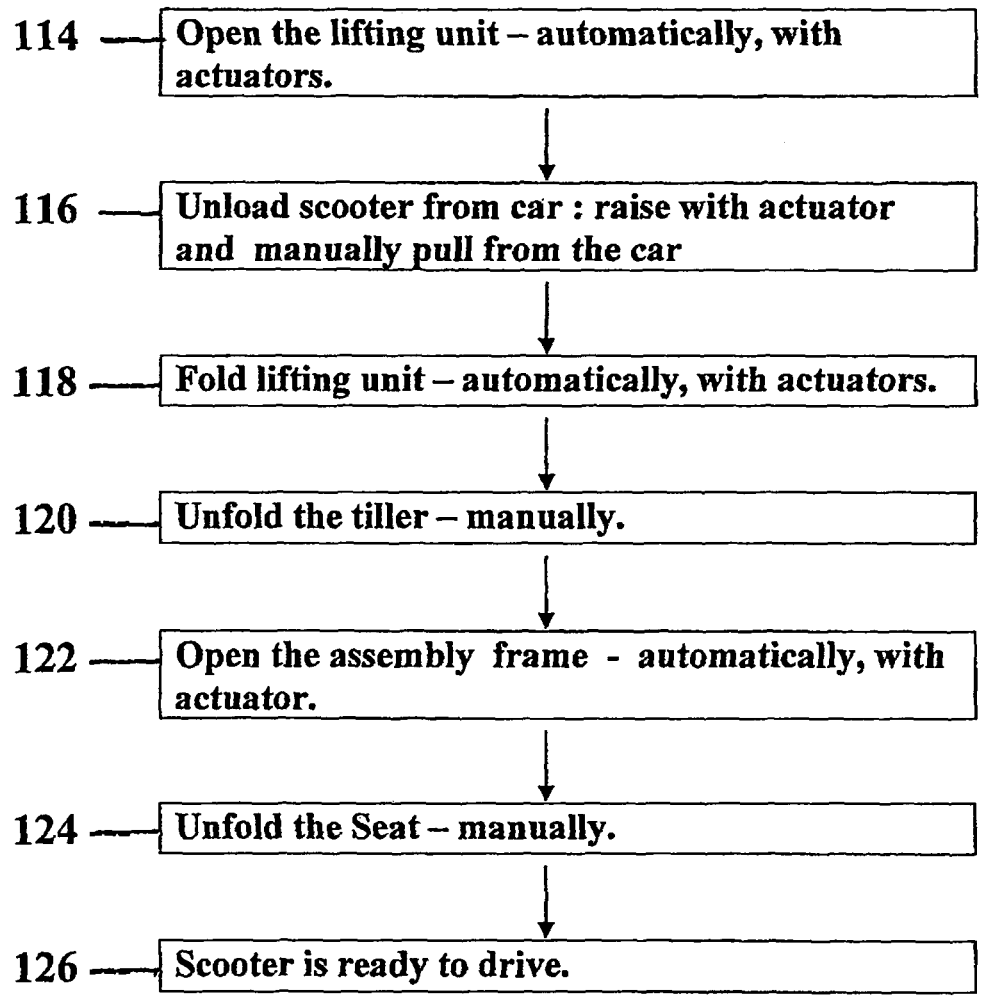
FIG. 8 is a flow-chart describing the sequence of activities in downloading a scooter with a fixed-to-scooter lifting unit from a car and unfolding it, in accordance with an embodiment of the present invention.

The sequence of activities of downloading scooter 10 from a car 90 and unfolding it, (the reverse activities of folding and loading of the scooter), given in FIG. 6 to FIG. 1, is itemized in FIG. 8 in the form of a flow-chart. The flow-chart also indicates manual and automatic activities.

FIG. 7 is a flow-chart describing the sequence of activities in folding, lifting and loading a scooter into a car, in accordance with an embodiment of the present invention. The sequence of activities, as numbered in the figure starts with the manual folding of the seat, activity designated: 100, followed by an actuator automatic folding of the assembly frame, designated: 102. The tiller is manually folded, designated: 104 actuators automatically open the lifting unit, designated 106. The lifting unit lifts the scooter automatically to the height of the car with the aid of actuators, designated: 108. Next, the lifting unit folds automatically with the aid of actuators, activity designated: 110 and the scooter is loaded into the car ready to be transported, designated: 112.

FIG. 8 is a flow-chart describing the sequence of activities in downloading the scooter from a car and unfolding it, in accordance with an embodiment of the present invention. The sequence of activities, as numbered in the figure, is a reverse sequence of activities described in FIG. 7 and starts with the automatic opening of the lifting unit with the aid of actuators, activity designated: 114. Next, the lifting unit lowers the scooter automatically to the ground with the aid of actuators, designated: 116. The lifting unit folds automatically with the aid of actuators, designated: 118. Next, the tiller is opened manually, activity designated: 120 and the assembly frame is automatically opened with the aid of an actuator, designated: 122. The seat is unfolded manually, designated: 124 and the scooter is ready to drive, designated: 126.

Figure 9:
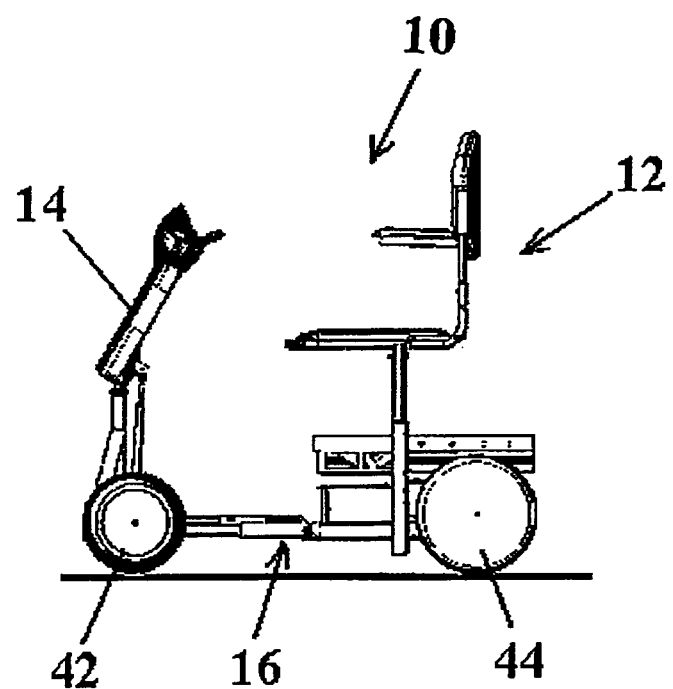
FIG. 9 illustrates a scooter constructed with a detachably-connected lifting unit positioned on the ground in a ready-to-travel state, in accordance with an embodiment of the present invention. In the Figure the detachably-connected lifting unit is disconnected from the scooter and not shown.

FIG. 9 illustrates a scooter 10 constructed with a detachably-connected lifting unit. The scooter is illustrated with the detachably-connected lifting unit 18 disconnected from the vehicle (and not shown in the FIG.) and positioned on the ground in a ready-to-travel state.

Figure 11:
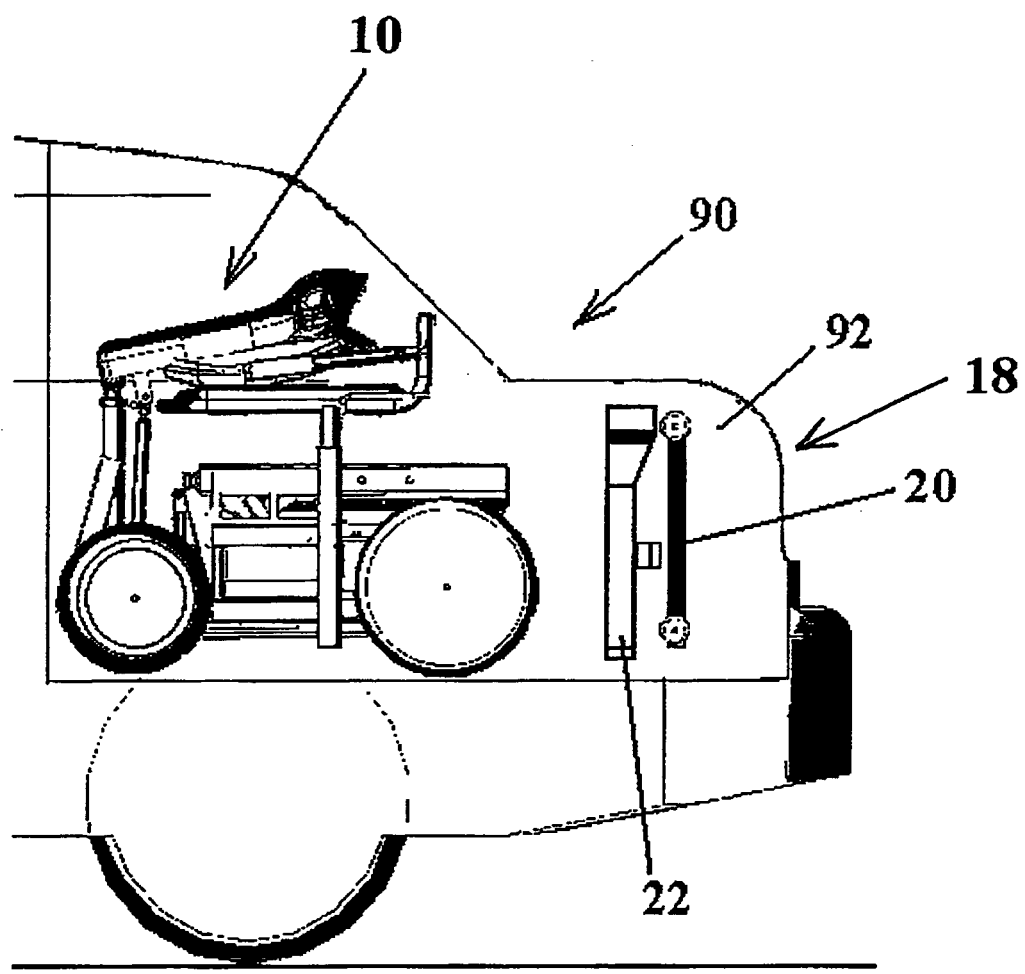
FIG. 11 illustrates the scooter shown in FIG. 9, placed in the closed trunk of a car together with the detachably-connected lifting unit. The lifting unit is shown disconnected from the scooter, disassembled and stored in the trunk of the car, beside the scooter.

Reference is now made to a detailed (and separated) description of lifting unit 18. While the fixed-to-scooter lifting unit 18, illustrated in FIG. 5 and FIG. 6, remains as a an assembled unit in both deployed and folded states, the detachably-connected lifting unit 18 may be disassembled when folded, as illustrated in FIG. 11.

Figure 10A:
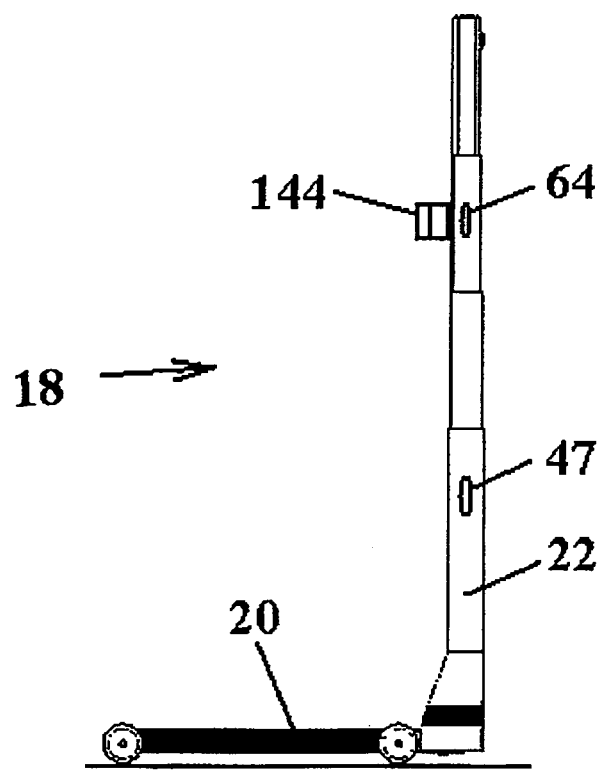
FIG. 10A illustrates a detachably-connected lifting unit, in accordance with an embodiment of the present invention, in an elevated state after disconnecting from a lifted scooter or prior to connecting to a scooter for lowering.

FIG. 10A illustrates scooter's 10 detachably-connected lifting unit 18 in an elevated state after disconnecting from scooter 10 (illustrated in FIG. 9) after lifting or prior to connecting to scooter for lowering.

Figure 10B:
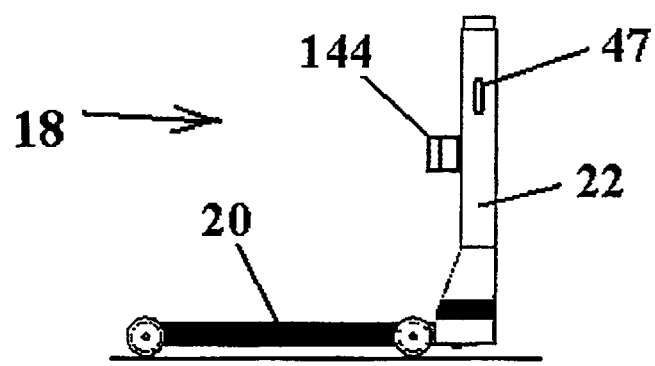
FIG. 10B illustrates the detachably-connected lifting unit illustrated in FIG. 10A in a compressed state, after disconnecting from a lowered scooter or prior to connecting to a scooter for lifting.

FIG. 10B illustrates detachably-connected lifting unit 18 in a compressed state, after disconnecting from a lowered scooter 10 or prior to connecting scooter 10 for lifting.

Lifting unit 18 is constructed of a support base with wheels ("trolley wagon") 20 extended from the base of lifting-arm 22. Lifting-arm 22 is composed of telescopic components that can be stretched or compressed (FIG. 10A and FIG. 10B, respectively) at will. The mechanism of operating lifting unit 18 is controlled by actuators 63 and 47. Connector-unit 144 is rigidly fixed to the upper portion of lifting-arm 22 of lifting unit 18 and reversibly connects to the back side of scooter 10 (scooter without lifting unit 18 is illustrated in FIG. 9). When coupled to a detachably-connected lift unit 18 (FIG. 10A and FIG. 10B) scooter 10 can be raised and lowered at will from and to a trunk of a car, as illustrated in FIG. 1 to FIG. 4. For efficient and convenient storage when not in use, detachably-connected lift unit 10 can be disassembled by disengaging trolley wagon 20 from lifting-arm 22 (as shown in FIG. 11).

FIG. 11 illustrates scooter 10 shown in FIG. 9, folded and placed in closed trunk 92 of car 90. Trunk 92 also contains detachably-connected lifting unit 18, stored in a disassembled state in which trolley wagon 20 is disengaged from lifting-arm 22.

FIG. 12 is a flow-chart describing the sequence of activities in lowering scooter 10 with the aid of a detachably-connected lifting unit 18 from a car 90, in accordance with an embodiment of the present invention.

The sequence of activities, as numbered in the figure, starts with the unloading of detachably-connected lifting unit 18 (constructed of trolley wagon 20 and lifting-arm 22) from the trunk of the car, activity designated: 150. Lifting unit 18 is assembled and opened on the floor, designated: 114. Next, lifting unit 18 is adjusted and attached to the back of folded scooter 10 standing in the trunk of the car, activity designated: 116. The scooter is raised, manually pulled from the car and lowered to the floor. Detachably-connected lifting unit 18 is disconnected from the scooter when the scooter is positioned on the floor, activity designated: 154. Detachably-connected lifting unit 18 is folded and disassembled for storage, activity designated: 158. It is possible to carry detachably-connected lifting unit 18 with the scooter or to store the device in the car or elsewhere. Next, the tiller of the scooter is opened manually, activity designated: 120 and the assembly frame is automatically opened with the aid of an actuator, designated 122. The seat is manually unfolded, designated 124 and the scooter is ready to drive, activity designated: 126.

FIG. 13 is a flow-chart describing the sequence of activities in loading scooter 10 with the aid of a detachably-connected lifting unit to a car 90, in accordance with an embodiment of the present invention.

The sequence of activities, as numbered in the figure, starts with the positioning of scooter 10 near car 90, activity designated 126 in the FIG. The scooter is made ready for transport by manually folding the seat, designated: 100 and with the aid of actuators, folding of the assembly-frame, designated: 102. The tiller is manually folded, activity designated: 104. Next the detachably-connected lifting unit 18 (constructed of trolley wagon 20 and lifting-arm 22) is assembled and unfolded manually or with actuators, designated: 158. With both lifting unit 18 and scooter 10 on the floor, the lifting unit is connected to the back of the scooter, activity designated: 154. Detachably-connected lifting unit 18 raises scooter 10 from the floor and the lifted scooter is manually pushed towards the car, activity designated: 160. The scooter is lowered into the car and detached from the lifting unit, designated: 162. Detachably-connected-lift 142 is manually or with actuators disassembled and folded for storage, activity designated 164.

In another embodiment of the present invention, the division between the manual activities and the motorized activities in folding and maneuvering with the folded scooter are different than those listed in the embodiment above. For example: the telescopic extendable bars of the frame-assembly, 43 and 45, are mechanically operated (instead of being driven by an actuator) and opening of the lifting unit 18 is partly or fully done manually (instead of being powered by actuators).

The self-lifting and self-loading feature is very advantageous in mobility scooters (also known as "mobilizers"), which is primarily designed for elderly persons or persons with locomotion disabilities and other related handicaps. It offers the user a good solution for loading and unloading, freeing the user from the strenuous task of lifting a heavy load and placing it in the trunk of his car, or unloading it.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A mobility scooter device comprising: an electrically powered wheeled vehicle provided with a contractible lifting unit for lifting or lowering, and moving the vehicle over the ground, the lifting unit comprising an extendable lifting arm having two end portions a first end portion, a structure on a side of the first end portion being configured to support a back of the vehicle so as to lift the entire vehicle above a height of a transportation platform when the lifting arm is extended, and a second end portion coupled to a support base provided with wheels that is extendable from the second end portion and, when the vehicle is lifted, is rollable under the transportation platform to position the entire lifted vehicle over the transportation platform to enable lowering the vehicle body directly onto the platform.

2. The device as claimed in claim 1, wherein the extendable lifting arm comprises telescopically extendable bars.

3. The device as claimed in claim 1, wherein the extendable lifting arm is electrically operated.

4. The device as claimed in claim 1, wherein the extendable lifting arm is tiltable between a substantially horizontal position when not in use and a substantially vertical position when in use.

5. The device as claimed in claim 1, wherein the scooter comprises foldable parts.

6. The device as claimed in claim 1, wherein the lifting unit is automatically operated.

7. The device as claimed in claim 1, wherein the lifting unit is semi-automatic.

8. The device as claimed in claim 1, further provided with a remote control for remotely activating the lifting unit.

9. The device as claimed in claim 1, wherein the lifting unit is detachably connected to the electrically powered wheeled vehicle.

10. The device as claimed in claim 1, wherein the lifting unit is fixedly connected to the electrically powered wheeled vehicle.

11. The device as claimed in claim 1, wherein the lifting unit is an integral part of the electrically powered wheeled vehicle.

12. The device of claim 1, wherein the transportation platform comprises a trunk of a vehicle.

13. A method for loading and downloading a mobility scooter onto and from a transportation platform, the method comprising:

providing a lifting unit for lifting or lowering, and moving the scooter over the ground, the lifting unit comprising an extendable and contractible lifting arm having two end portions, a first end portion, a structure on a side of the first end portion being connected to a back of the scooter and configured to support the scooter, and a second end portion coupled to a support base that extends from the second end portion under the supported scooter and that is provided with wheels;

actuating the extendable lifting arm to lift the scooter above a height of the platform; and wheeling the support base under the platform so as to bring the entire lifted scooter over the platform and lowering the scooter onto the platform.

14. The method of claim 13, wherein the transportation platform comprises a trunk of a vehicle.

* * * * *